Patented Sept. 16, 1952

2,610,910

UNITED STATES PATENT OFFICE 2,610,910

NEOPRENE-PHENOLIC ADHESIVE CEMENT

Andrew Farley Thomson, Highland Park, Mich., assignor to Minnesota Mining & Manufacturing Company, St. Paul, Minn., a corporation of Delaware No Drawing. Application January 13, 1949,
Serial No. 70,798

10 Claims. (Cl. 51—298)

This application is a continuation-in-part of my application Serial No. 501,497, filed September 7, 1943.

This invention relates to adhesive cements. More particularly it relates to cements comprising polymerized chloroprene or neoprene and a phenol-aldehyde resin, especially of the type hereinafter defined, blended together and dissolved in a suitable volatile solvent therefor.

Prior to my invention, in so far as I am aware, no one ever produced a neoprene, phenol-aldehyde resin adhesive cement which could be applied to a smooth metal surface and would quickly develop a high degree of adhesion thereto and/or a high bond strength at ordinary room temperatures, without heating in situ. My novel cements, as herein described, possess these desirable and novel characteristics.

Polymerized chloroprene or neoprene differs from natural rubber and Buna S and other comparable synthetic rubbers, for example, in that it is highly insoluble in ordinary gasoline, is not vulcanizable with the usual sulphur type vulcanizing agents employed with natural rubber and Buna S synthetic rubber, and does not have its tensile strength increased (as natural rubber does) by incorporating carbon black therewith. There are other significant differences between neoprene, on the one hand, and natural rubber, Buna S, butyl rubber and reclaimed rubber on the other hand.

Heretofore, others have produced many adhesive compositions comprising natural rubber and comparable synthetic rubbers, such as Buna S synthetic rubber. Others have previously also suggested certain compositions comprising a mixture of natural rubber or Buna S synthetic rubber with certain types of phenolic resins. For example, others have heretofore suggested the use of certain phenol aldehyde resins in admixture with natural rubber or with an equivalent type of synthetic rubber, such as Buna S synthetic rubber. Various compositions have been proposed where, if one attempted to replace the natural rubber with neoprene, the result would be a completely useless conglomeration of ingredients. As an example, in Charch Patent Number 2,128,635 the use of resorcinol aldehyde is disclosed as the phenol aldehyde resin of Charch's composition. While such a resin apparently performs as intended where natural rubber or equivalent synthetic rubber, such as Buna S, is employed, such resin would not be compatible with polymerized chloroprene or neoprene.

There have been a number of suggestions heretofore of employing natural rubber or the like with relatively low proportions, e. g. 30% based on the rubber, of phenol-aldehyde resins. It was common in such prior compositions, upon application thereof as a film or coating, then to heat the same in situ to develop bond strength, although some few suggested heating the rubbery polymer and the particular phenolic, to effect a reaction therebetween, and then applying the resulting material as a coating.

Prior to my invention no one, insofar as I am aware, ever produced or offered in commerce a neoprene, phenol aldehyde adhesive cement composition which could be applied as a coating or film and used at ordinary room temperatures and which would provide a bond of high adhesion to smooth metal surfaces and high tensile strength or bond strength, without heating in situ. My compositions are adapted for application as a film or coating at ordinary room temperatures; additionally, they do not require heat reaction of the neoprene polymer and the phenolic resin either before or after application as a film or coating.

Kuzmick et al. U. S. Patent No. 2,122,691 gives an example of a neoprene, phenol-aldehyde type composition requiring heating in situ, his particular phenol aldehyde being a cresol formaldehyde tung oil complex, and being employed in the particular proportions stated in the patent. Thus Kuzmick et al. did not secure the result of my invention. Neither did anyone else previously, to my knowledge, ever produce an adhesive cement composition comprising a phenol-aldehyde resin and any rubbery polymer, which cement composition, in the form of a film or coating, would quickly develop a tack and film strength at ordinary room temperatures at all comparable to my adhesive cement compositions, as described hereinafter.

It is an object of my invention to overcome many shortcomings of prior compositions of the type above referred to. Another primary object is to provide a composition which, upon application as a film or coating and the mere evaporation of solvent and brief curing at normal room temperatures, will develop high tack and high film strength, as broadly distinguished from cements of the type requiring heating in situ in film form. Another object of my invention is to provide a solvent type adhesive cement with a neoprene base and of such character that upon application as a film or coating and the mere evaporation of solvent and curing at room temperatures will develop bond strength in the early stages at least about as rapidly as will a reclaimed rubber, limed rosin solvent-type cement, of the type described in Zimmerli et al. U. S. Patent No. 1,937,861; and further characterized in that after curing at room temperatures for three days will have a bond strength of about twice that of such a Zimmerli cement; and still further characterized in that after curing or ageing at such temperature for one to two weeks will have a bond strength of three to four times that of such a Zimmerli cement after a similar amount of curing. A further ancillary object of my invention is to provide an adhesive composition of the solvent type in which the neoprene polymer and the phenol aldehyde resin are uniformly blended and dissolved, as distinguished from compositions in which the neoprene is dispersed in a resin solution, or vice versa. These and other objects and advantages will appear from the specification taken as a whole. Where I refer to "neoprene" herein, it will be understood that I thereby refer to polymerized chloroprene and also to polymers of chloroprene with quite minor proportions of other monomers such as isoprene, butadiene, and acrylonitrile or the like, so long as the final polymers have the usual neoprene properties well-known in ordinary neoprenes of commerce (e. g. high insolubility in ordinary gasoline and incapability of being vulcanized with ordinary sulphur vulcanizing agents for ordinary rubber).

The adhesive cements of this invention are to be broadly distinguished from such polymerized chloroprene compositions as have heretofore been employed in cement form in adhering leather, fabric and similar porous and fibrous materials to themselves and to each other, as in the shoe industry. Such prior polymerized chloroprene cements have, in general, been ineffective in securing fabrics or other elements to non-porous surfaces such as smooth metal surfaces, because of lack of tack and adhesion. The dried residues obtained from such prior cements have generally been thermo-plastic and of a weakly adherent nature, and generally depend upon a mechanical interlocking with the fibers of a fibrous sheet, or the like, in order to form an effective bond. Ordinarily certain thermoplastic resins are used, in low percentage proportion, with neoprene in forming such cements.

By employing certain types of phenol aldehyde resins, in certain ranges of proportions as hereinafter set forth, with neoprene I have found that I can produce a class of adhesive cements having characteristics and advantages which are new and unique over anything heretofore known to me. In general I have found that I should employ a phenol aldehyde resin consisting of the condensation product of a phenol substituted in the para position by a side chain radical containing at least three carbon atoms (and preferably at least four carbon atoms) and an aldehyde of a saturated aliphatic alcohol. In order that the phenol aldehyde resin be of the desired reactive type the aldehyde should be present in excess of about a 1 to 1 molecular ratio, in relation to the phenol, and the condensation reaction (to produce the phenol aldehyde resin) should be carried out in the presence of an alkaline catalyst, e. g. NaOH, KOH, NH4OH, Na2CO3, etc. The condensation reaction is not carried to completion, leaving the resin of intermediate molecular size; but the condensation reaction is carried far enough to provide a solid resin, at ordinary room temperatures. The phenol should have only two particularly reaction favorable positions in the molecule unoccupied. Examples of such a phenol are para-tertiary butyl phenol, para-tertiary amyl phenol, para-phenyl phenol and para-octyl phenol. Examples of a suitable aldehyde of a saturated aliphatic alcohol are formaldehyde and acetaldehyde.

The excess of aldehyde, e. g. formaldehyde, over a 1 to 1 molecular ratio of aldehyde to phenol is usually such as to give a molecular ratio of aldehyde to phenol within the range of 1.2 to 1 up to 1.6 to 1, although there can be variations from this range, so long as a molecular excess of the aldehyde over the phenol is employed, to provide a suitably reactive phenol aldehyde resin.

In respect to proportions of such a phenol aldehyde resin to neoprene I have found that the phenol aldehyde resin should be present to an extent by weight in excess of one-half that of the neoprene and, at the other end of the range, should not be present to a greater extent than 1½ to 2 times that of the neoprene. My preferred compositions have the phenol aldehyde resin present to the extent by weight of 60–90% of the neoprene. Where the proportion of the phenol aldehyde resin to the neoprene is reduced below about 60%, I find that the bond strength of the resulting cement begins to fall off quite noticeably, so that compositions where the phenol aldehyde resin is present to the extent of less than half that of the neoprene become quite inferior in bond strength, and it is desirable not to let the proportion of the phenol aldehyde resin drop below about 55% by weight of the neoprene. For most commercial uses I have found that my adhesive cements can best be made with the phenol aldehyde present in the range of 65 to 85%, by weight, of the neoprene.

My invention will now be more specifically illustrated by giving a few illustrative embodiments or examples thereof.

EXAMPLE 1

Part A.—Polychloroprene base

| | Parts by weight |
|---|---|
| Polychloroprene (neoprene) | 500 |
| Phenyl-alpha-naphthylamine (antioxidant) | 10 |
| Extra light calcined magnesia | 20 |
| Zinc oxide | 25 |

Mill the polymer on a rubber mill until it forms a continuous sheet around the roll. Add the antioxidant and magnesia, and finally the zinc oxide. Remove from the mill, and cut into convenient size pieces for dissolving.

Part B.—Cement

| | Parts by weight |
|---|---|
| Base stock as prepared in part A | 100 |
| Para-tertiary butyl phenol formaldehyde resin | 75 |
| Coumarone-indene resin (M. P. about 300° F.) | 25 |
| Toluol | 350 |

Dissolve the resins, then the freshly prepared base stock, in the toluol in a churn type mixer.

Neoprene Type CG is a preferred polychloroprene or neoprene polymer. However, other types of chloroprene polymers, such as Neoprene Type E or Type GN, may also be used. In general neoprene polymers are preferred which (in the absence of milling) have a relatively high durometer hardness value.

A good commercial example of the phenol aldehyde resin above given is "Super-Beckacite #1003," a product of Reichhold Chemicals, Inc., Ferndale, Michigan. It is a 100% phenol-formaldehyde resin, produced by condensing in excess of 1 mol of formaldehyde with 1 mol of paratertiary butyl phenol, in the presence of an alkaline catalyst, to provide a resin, solid at room temperatures (e. g. melting, when first heated, at 155° to 180° F.) and soluble in alcohols, acetates, coal tar solvents, turpentine and drying oils. The mol ratio of formaldehyde to phenol is, in general, between 1:1 and 2:1, and about 1.5 to 1 is an example of a good ratio.

The phenolic resins of the type above described contribute both adhesion and internal strength to the dried residue of my adhesive cements. Surprisingly high internal strength is obtained merely by complete elimination of solvent from my cement at ordinary room temperatures. It has a wet strength, immediately after bonding, of the same order as that of a Zimmerli type cement, but upon continued ageing, it will soon exceed a film of Zimmerli cement in strength; and following the elapse of three days after application as a film or coating, it will have a bond strength about twice as great as that of a film of a Zimmerli cement. Further increase in bond strength is secured (perhaps by reaction, or further reaction, of the phenolic resin with the neoprene polymer) by further ageing at room temperature, with the result that, after curing for one to two weeks, it has a bond strength three or four times that of a Zimmerli cement (as hereinabove identified).

EXAMPLE 2

*Part A.—Polychloroprene base*

| | Parts by weight |
|---|---|
| Polychloroprene (i. e. neoprene) | 500 |
| Phenyl - alpha - naphthylamine (antioxidant) | 10 |

Mill the neoprene polymer on a rubber mill until it forms a continuous sheet around the roll. Add the antioxidant. Then remove from the mill and cut into convenient size pieces for dissolving.

*Part B.—Cement*

| | Parts by weight |
|---|---|
| Base stock as prepared in part A | 100 |
| Para-tertiary amylphenol-formaldehyde resin | 85 |
| Benzol | 350 |

Dissolve the resin, then the freshly prepared base stock, in the benzol on a churn type mixer.

The adhesive composition of Example 2 is suitable for use as a clear weather-strip adhesive on painted surfaces, where any excess of adhesive must not show. It develops wet strength rapidly and, after a few days ageing, tenaciously holds even highly plasticized sponge-rubber weatherstrip to enameled or lacquered surfaces.

EXAMPLE 3

*Part A.—Polychloroprene base*

| | Parts by weight |
|---|---|
| Polychloroprene (neoprene) | 500 |
| Phenyl - alpha - naphthylamine (antioxidant) | 10 |
| Extra light calcined magnesia | 20 |
| Zinc oxide | 25 |

Milling procedure same as for Example 1.

*Part B.—Cement*

| | Parts by weight |
|---|---|
| Base stock as prepared in part A | 100 |
| Para - phenylphenol - formaldehyde resin (such as "Bakelite #3360" resin) | 55 |
| Modified pentaerythritol ester or polymerized rosin (such as "Pentalyn H") | 25 |
| Toluol | 350 |

The adhesive composition of Example 3 is suitable for use where a high degree of flexibility is required, for example in laminating abrasive sheets (as a non-slip surfacing) to aluminum aircraft wings.

The composition of Example 1, however, has been more commonly used to bond the back, or non-abrasive side, of abrasive coated sheet material to a metal surface, e. g. a rigid metal support, a battleship deck, stone or concrete stairs, etc.; but a bond formed with the composition of Example 3 provides somewhat greater flexibility of bond, where such is desired.

The composition of Example 3 differs from that of Example 1 in that a lower percentage of the phenol-aldehyde resin is employed in Example 3 than in Example 1. Also it will be noted that a specifically different phenol-aldehyde resin, but of the particular type hereinabove described, is employed.

It will further be seen that a modified pentaerythritol ester of polymerized rosin is employed in lieu of the coumarone-indene resin of Example 1.

Example 2 differs from both of Examples 1 and 3 in that the only solids ingredient which it contains in addition to the neoprene polymer and phenol-aldehyde is the antioxidant. The antioxidant, preferred in all examples, improves the ageing life of the neoprene polymer, and resists embrittlement due to oxidation.

As illustrated by Example 2, the other additional ingredients of Examples 1 and 3 are not essential to the broader aspects of my invention. However, they have been found to provide some additional advantages, under various circumstances, and hence the use of them, or similar materials, is usually preferred. The magnesia, for example, shown both in Examples 1 and 3, is desirable where the adhesive cement is to be employed in contact with cloth or metal, or other materials affected by an acid condition. It is normal in the ageing of neoprene for small amounts of hydrochloric acid to be formed. The calcined magnesia serves as a suitable acid acceptor and is not otherwise harmful to the composition. Both magnesium oxide and zinc oxide, the latter also being shown in Examples 1 and 3, are commonly used in many neoprene compositions and give certain well appreciated advantages. However, it is believed that these ingredients have some additional, or special, advantages in my adhesive cement compositions, and may serve to catalyze a reaction between the neoprene polymer and the phenol-aldehyde resin during ageing at room temperatures. While such catalyzing action is not essential to the development of quite high bond strengths, the presence of such ingredients affects the increase of bond strength with ageing in a direction and to an extent which is of real further advantage for a number of important commercial uses.

Another difference between Examples 1 and 3, on the one hand and Example 2, on the other hand, is that Example 2 contains no coumarone-indene resin or like thermoplastic resin compatible with the neoprene. While such a compatible thermoplastic resin is not essential, as illustrated in Example 2, yet when employed, for example, in quantities of the general order illustrated in Examples 1 and 3, it has the effect of causing the solvent to be released more rapidly from the adhesive cement when applied as a film or coating in use, thereby aiding the cement to more rapidly develop wet strength. What may be the mechanism of this effect is not known, but, in general, high melting point thermoplastic resins compatible with neoprene, employed in any proportion up to about 30% or 40% of the neoprene polymer, functions to improve the rate at which bond strength will develop in a film or coating, following application of the cement to a surface in use. Additionally, such a thermoplastic resin has been found to improve the shelf life, or can ageing life, of my adhesive cement compositions. By way of illustration, a cement as shown in Example 1 has a can ageing life of at least one year, whereas a similar cement, except for replacement of the thermoplastic resin with corresponding amount of phenol-aldehyde resin, has its can life reduced to about three months, or perhaps even to about two months. Such a can ageing life, however, is still adequate for many uses.

The particular coumarone-indene used in Example 1 was a light colored grade having a melting range of 150–160° C. The thermoplastic resin of Example 3 (i. e. the modified pentaerythritol ester of polymerized rosin) had a melting range of about 120–125° C. Lower melting point resins appear to be less effective in releasing the solvent from my adhesive cements in film form; although somewhat lower melting point thermoplastic resins which are compatible with neoprene can be employed to some advantage.

The adhesive cements of this invention may advantageously be employed for many difficult cementing and adhesive uses. For example, they may be employed in permanently adhering abrasive coated sheets or strips to metal decks, to provide a non-skid surfacing material thereon. The non-skid sheeting may consist of an impregnated cloth base carrying a surfacing coating of mineral or abrasive grains bonded to the base with a resinous binder. My adhesive cement solution may be applied, as by brushing, on either or both of the surfaces which are to be joined together. The solvent will be eliminated by evaporation. By allowing some evaporation of solvent before the bond is made, the bond strength of the coating will develop more rapidly.

Such non-skid treads have been bonded effectively with my adhesive cement to such varied surfaces as smooth steel, aluminum, and painted wood surfaces, as well as to concrete and masonry surfaces. The bonds produced were exceptionally strong and tough, and were highly resistant to heat, solvents, oil, oxygen and moisture.

My cements have also been employed to bond sponge rubber strips to metal and plastics, as a weatherstrip material; to adhere a cotton covering on the decks of ships; to impregnate and bond glass cloth to the surface of pipes to serve as a fire resistant insulation; to adhere vinyl resin sheeting to itself and to metals; to serve as a binder in the manufacture of brake linings; to fasten rubber cushions to plastics in the manufacture of radios; to bond linoleum trim to aluminum in railroad car manufacture; to fasten rubber to glass in making double pane windows; and to permanently bond formica table tops to metal and wood underlying surfaces. My adhesive cements have many other uses and their merit is especially evident where a permanent adhesive is required having an exceptionally high bond strength and/or where the bond is to be between (or to) materials or under conditions where it would be inconvenient, expensive or impossible to heat the cement film in situ. There are a number of usages, such as various of those above illustrated, where a Zimmerli type cement as hereinabove identified, does not provide a bond of sufficient strength under the various conditions encountered in usage so as to provide an acceptable adhesive. My cements provide a different and much higher order of bonding strength.

As an illustration of the strength of bonds prepared by the adhesive cements of this invention, two sets of specimens were prepared, by brushing liquid adhesive cement or composition to be tested on a steel panel, pressing a fabric strip in place thereon and allowing the composite to dry and age at room temperature for two weeks. One set of the specimens was prepared by using the adhesive of Example 1 hereof. The other set of specimens was prepared using a Zimmerli type adhesive. On a strip back test of the two sets of specimens, conducted by stripping the fabric back on itself on a tensile test machine operating at a jaw separation speed of two inches per minute, and expressing the results in pounds per inch of width of the strip tested, the specimens formed with the cement of this invention showed a strip back value of 43 lbs. per inch, whereas the specimens formed with the Zimmerli cement showed a strip back value of approximately 8 lbs. per inch of width.

Another set of specimens was similarly prepared except that the adhesive cement employed was made in accordance with the following formula:

| | Grams |
|---|---|
| Rubber (smoked sheet) | 100 |
| Phenol-aldehyde resin (same as in Example 1 hereinabove) | 100 |
| Toluol | 400 |

The specimens made by coating the adhesive cement just indicated (which is similar to that shown in Bitterich U. S. Patent No. 2,211,048), and also curing simply at room temperatures for two weeks, showed strip back values of approximately 3.5 lbs. per inch of width (even lower than the Zimmerli type cement). It is, of course, true that if the last mentioned specimens were heated in situ, e. g. at temperatures of about 170–180° C., as recommended in the Bitterich patent, substantial increases in bond strength would occur.

In place of toluol or benzene, as illustrated in the examples given above, I may employ as my solvent various aromatic hydrocarbons, chlorinated hydrocarbons and petroleum solvents containing high percentages of aromatic or naphthenic constituents, as well as other suitable volatile solvents in which the ingredients of my cement compositions are soluble to give the cement a suitable consistency, for example as hereinabove illustrated.

Where desired, various pigments, inert fillers, (granular or fibrous) or coloring materials may be added to any of my cement compositions. Fibrous material such as asbestos fibers are advantageous in some uses, e. g. to reduce the flow of the wet cement when applied in thick layers, as in covering metal to metal joints, and such like.

While my invention has been described in various details and various examples given, it will be understood that these are for purposes of illustration and that all embodiments within the scope of my invention as herein described or claimed are comprehended.

What I claim is:

1. A solvent type adhesive cement composition which is resistant to gelation in solution during storage, and upon application as a coating to impervious smooth metal surfaces forms a strongly adherent film of high internal strength on mere evaporation of solvent and brief ageing at normal room temperatures, said composition comprising a uniform blend of polychloroprene and a normally solid phenol-aldehyde resin, said blend being dissolved in a volatile organic solvent therefor to provide a viscous liquid adhesive composition, said phenol-aldehyde resin consisting of the alkaline catalyzed condensation product of an aldehyde of the class consisting of formaldehyde and acetaldehyde and a monohydric phenol having only two particularly reaction favorable positions in the molecule and substituted only in the para position by a side chain radical from the group consisting of alkyl and aryl hydrocarbon radicals containing at least four carbon atoms, the aldehyde being present in excess of a 1:1 molecular ratio in relation to said phenol, said phenol aldehyde resin being present to the extent by weight of more than half that of the polychloroprene but not to a greater extent than twice that of said polychloroprene; the said adhesive cement composition, upon application at ordinary room temperature as a film or coating to a smooth metal surface and attachment of a fabric sheeting thereto, will at first develop bond strength at approximately the same rate as an ordinary solvent type reclaimed rubber, limed rosin cement which has equal parts of reclaimed rubber and limed rosin, and after three days at room temperature will have developed a bond strength far greater than that of such reclaimed rubber, limed rosin cement, and of the order of twice that of coatings of said reclaimed rubber, limed rosin cement.

2. A solvent type adhesive cement composition which is resistant to gelation in solution during storage, and upon application as a coating to impervious smooth metal surfaces forms a strongly adherent film of high internal strength on mere evaporation of solvent and brief ageing at normal room temperatures, said composition comprising a uniform blend of polychloroprene and a phenol-aldehyde resin, said blend being dissolved in a volatile organic solvent therefor to provide a viscous liquid adhesive composition, said phenol aldehyde resin consisting of the alkaline catalyzed condensation product of formaldehyde and a monohydric phenol having only two particularly reaction favorable positions in the molecule and substituted only in the para position by a side chain radical from the group consisting of alkyl and aryl hydrocarbon radicals containing 4–8 carbon atoms, the mol proportion of the formaldehyde to the said phenol being within the range of approximately 1.2:1 up to 1.6:1, the condensation reaction between said phenol and formaldehyde being carried to a point so as to provide a phenol aldehyde resin which is a solid at room temperature and has a melting point, when first heated, substantially above room temperatures but not greater than about 180° F., said phenol aldehyde resin being present within the range of 65–85 parts, by weight, to 100 parts of said polychloroprene, the said adhesive cement composition, upon application at ordinary room temperature as a film or coating to a smooth metal surface and attachment of a fabric sheeting thereto, will at first develop bond strength at approximately the same rate as an ordinary solvent type reclaimed rubber, limed rosin cement which has equal parts of reclaimed rubber and limed rosin, and after two weeks at room temperature will have a bond strength well in excess of twice that of coatings or films of such a reclaimed rubber, limed rosin cement.

3. An adhesive cement composition which is resistant to gelation in solution during storage and upon application as a coating to impervious metal surfaces and the like forms a strongly adherent film of high internal strength on evaporation of solvent and brief ageing at normal room temperature, said composition comprising a uniform blend of polymerized chloroprene and a phenol-aldehyde resin, said phenol-aldehyde resin being a solid at room temperatures and being composed substantially completely of the alkaline-catalyzed partial condensation product of para-tertiarybutyl phenol and formaldehyde, said formaldehyde being in excess of equimolecular proportions with said phenol, said phenol-aldehyde resin being present in the range of 55–150 parts by weight thereof to 100 parts by weight of said polymerized chloroprene, said uniform blend of polychloroprene and resin being dissolved in a volatile aromatic hydrocarbon solvent to provide a viscous liquid adhesive composition.

4. An adhesive cement composition which is resistant to gelation in solution during storage and upon application as a coating to impervious metal surfaces and the like forms a strongly adherent film of high internal strength on evaporation of solvent and brief ageing at normal room temperature, said composition comprising a uniform blend of polymerized chloroprene and a phenol-aldehyde resin, said phenol-aldehyde resin being a solid at room temperatures and being composed substantially completely of the alkaline-catalyzed partial condensation product of para-tertiary-amyl phenol and formaldehyde, said formaldehyde being in excess of equimolecular proportions with said phenol, said phenol-aldehyde resin being present in the range of 55–150 parts by weight thereof to 100 parts by weight of said polymerized chloroprene, said uniform blend of polychloroprene and resin being dissolved in a volatile aromatic hydrocarbon solvent to provide a viscous liquid adhesive composition.

5. An adhesive cement composition which is resistant to gelation in solution during storage and upon application as a coating to impervious metal surfaces and the like forms a strongly adherent film of high internal strength on evaporation of solvent and brief ageing at normal room temperature, said composition comprising a uniform blend of polymerized chloroprene and a phenol-aldehyde resin, said phenol-aldehyde resin being a solid at room temperatures and being composed substantially completely of the alkaline-catalyzed partial condensation product of para-phenyl phenol and formaldehyde, said formaldehyde being in excess of equimolecular proportions with said phenol, said phenol-aldehyde resin being present in the range of 55–150 parts by weight thereof to 100 parts by weight of said polymerized chloroprene, said uniform blend of polychloroprene and resin being dissolved in a volatile aromatic hydrocarbon solvent to provide a viscous liquid adhesive composition.

6. An adhesive cement composition which is resistant to gelation in solution during storage, and upon application as a coating to impervious metal surfaces and the like forms a strongly adherent film of high internal strength on evaporation of solvent and brief aging at normal room temperature, said composition comprising a uniform blend of polymerized chloroprene and an oil-soluble, heat-hardening phenol-aldehyde resin, said phenol-aldehyde resin being present in excess of one-half that of said polychloroprene, by weight, but not being present in greater weight proportion than approximately that of said polychloroprene, said phenol-aldehyde resin consisting substantially completely of the condensation reaction product of formaldehyde and a substituted phenol to provide a resin which is a solid at room temperatures and which is compatible with the polychloroprene, said phenol being susbtituted in the para position by a side chain radical from the group consisting of alkyl and aryl hydrocarbon radicals, said formaldehyde being present in excess of equimolecular proportions with said phenol, said uniform blend of polymerized chloroprene and phenol-aldehyde resin being dissolved in a volatile, aromatic hydrocarbon solvent to provide a viscous liquid adhesive composition.

7. In a mineral coated sheet article having a coating of mineral grains bonded to a flexible backing and having a rigid supporting means secured to the other side of said backing, a resilient bond between the supporting means and the mineral coated sheet containing as an essentiail ingredient a substantial proportion of a mixture of polychloroprene and an oil-soluble heat-hardening phenol-aldehyde resin, said phenol-aldehyde resin being present in excess of one-half that of said polychloroprene, by weight, but not being present in greater weight proportion than approximately that of said polychloroprene, said phenol-aldehyde resin consisting substantially completely of the condensation reaction product of formaldehyde and a substituted phenol to provide a resin which is a solid at room temperatures and which is compatible with the polychloroprene.

8. A structure comprising a fibrous sheet having mineral grains bonded thereto, the surface of said fibrous sheet opposite from the one carrying said mineral grains being bonded to a metal surface by a resilient bond consisting of the dried residue of a smooth viscous solvent type cement comprising a blend of polychloroprene and a phenol-aldehyde resin, the phenol-aldehyde resin being an oil-soluble, heat-reactive condensation product of formaldehyde with a phenol substituted in the para position with a tertiary-butyl radical, the phenol-aldehyde resin being present in an amount by weight in excess of one-half that of said polychloroprene but not to a greater extent than approximately that of said polychloroprene.

9. An adhesive bonding composition capable of producing a firm bond to a smooth metal surface, comprising a uniform blend of polymerized chloroprene and an oil-soluble, heat-hardening, normally solid phenol-aldehyde resin, said blend being dissolved in a volatile organic solvent therefor to provide a viscous liquid adhesive composition, said phenol-aldehyde resin being present in excess of one-half that of said polychloroprene, by weight, but not being present in greater weight proportion than 150 parts thereof to 100 parts of said polychloroprene, said phenol-aldehyde resin consisting substantially completely of the condensation reaction product of formaldehyde and a substituted phenol to provide a resin which is a solid at room temperatures and which is compatible with the polychloroprene, said phenol being substituted in the para position by a side chain radical from the group consisting of alkyl and aryl hydrocarbon radicals containing at least four carbon atoms, said formaldehyde being present in excess of equimolecular proportions with said phenol, and said uniform blend of polymerized chloroprene and phenol-aldehyde resin being of such character as to provide a high-strength adhesive bond.

10. An adhesive bonding composition capable of producing a firm bond to smooth metal surfaces, comprising a uniform blend of polymerized chloroprene and phenol-aldehyde resin, said blend being dissolved in a volatile organic solvent therefor to provide a viscous liquid adhesive composition, said phenol-aldehyde resin being the condensation product of formaldehyde and a monohydric phenol having only two particularly reaction favorable positions in the molecule and substituted only in the para position by a non-olefinic organic side chain radical from the group consisting of alkyl and aryl hydrocarbon radicals having 4–8 carbon atoms, the aldehyde being employed in mol proportion in relation to said phenol in the range from 1:1 to 2:1, the condensation reaction between the said phenol and aldehyde being carried far enough to provide a phenol-aldehyde resin having a temporary softening point substantially above room temperatures but not greater than about 180° F., said phenol-aldehyde resin being present to the extent by weight of 60–90 parts to 100 parts of said polychloroprene, and said uniform blend of polychloroprene and phenol-aldehyde resin being of such character as to provide a high-strength adhesive bond.

ANDREW FARLEY THOMSON.

REFERENCES CITED

The following references are of record in the file of this patent:

UNITED STATES PATENTS

| Number | Name | Date |
|---|---|---|
| 1,931,309 | Thompson | Oct. 17, 1933 |
| 1,967,863 | Collins et al. | July 24, 1934 |
| 2,122,691 | Kuzmick et al. | July 5, 1938 |
| 2,211,048 | Bitterich | Aug. 13, 1940 |
| 2,323,130 | Harvey | June 29, 1943 |
| 2,337,424 | Stoner | Dec. 21, 1943 |
| 2,394,375 | Gross | Feb. 5, 1946 |
| 2,430,987 | Lindner et al. | Nov. 18, 1947 |
| 2,448,985 | Kuzmick et al. | Sept. 7, 1948 |

OTHER REFERENCES

Wakeman, "The Chemistry of Commercial Plastics," pages 163 and 164, pub. 1947 by Reinhold Pub. Corp., N. Y.